United States Patent
Nakayama et al.

(10) Patent No.: US 10,511,025 B2
(45) Date of Patent: Dec. 17, 2019

(54) ELECTRODE MANUFACTURING METHOD

(71) Applicant: Ube Industries, Ltd., Yamaguchi (JP)

(72) Inventors: Takeshige Nakayama, Yamaguchi (JP); Tomonori Nakayama, Yamaguchi (JP); Naoki Kitayama, Yamaguchi (JP)

(73) Assignee: UBE INDUSTRIES, LTD., Yamaguchi (JP)

(*) Notice: Subject to any disclaimer, the term of this patent is extended or adjusted under 35 U.S.C. 154(b) by 335 days.

(21) Appl. No.: 15/314,281

(22) PCT Filed: Jun. 5, 2015

(86) PCT No.: PCT/JP2015/066278
§ 371 (c)(1),
(2) Date: Nov. 28, 2016

(87) PCT Pub. No.: WO2015/186814
PCT Pub. Date: Dec. 10, 2015

(65) Prior Publication Data
US 2017/0194645 A1     Jul. 6, 2017

(30) Foreign Application Priority Data
Jun. 5, 2014     (JP) .................... 2014-116943

(51) Int. Cl.
H01M 4/62         (2006.01)
H01M 4/139        (2010.01)
H01M 4/1391       (2010.01)
H01M 4/1393       (2010.01)
H01M 4/1395       (2010.01)

(52) U.S. Cl.
CPC ............ *H01M 4/62* (2013.01); *H01M 4/139* (2013.01); *H01M 4/1391* (2013.01); *H01M 4/1393* (2013.01); *H01M 4/1395* (2013.01); *H01M 4/622* (2013.01)

(58) Field of Classification Search
None
See application file for complete search history.

(56) References Cited

U.S. PATENT DOCUMENTS

| | | | |
|---|---|---|---|
| 5,468,571 A | 11/1995 | Fujimoto et al. | |
| 8,597,812 B2 | 12/2013 | Terada et al. | |
| 8,865,334 B2 | 10/2014 | Terada et al. | |
| 2012/0028416 A1 | 2/2012 | Takamoto et al. | |
| 2012/0168688 A1 | 7/2012 | Nakayama et al. | |
| 2012/0219838 A1 | 8/2012 | Terada et al. | |
| 2013/0171520 A1 | 7/2013 | Nakayama et al. | |
| 2013/0302659 A1 | 11/2013 | Terada et al. | |
| 2014/0077128 A1 | 3/2014 | Inoue | |
| 2014/0178680 A1 | 6/2014 | Takamoto et al. | |
| 2014/0218875 A1 | 8/2014 | Nakayama et al. | |
| 2015/0027754 A1 | 1/2015 | Shimoda et al. | |
| 2017/0073545 A1 | 3/2017 | Nakayama | |

FOREIGN PATENT DOCUMENTS

| | | |
|---|---|---|
| CN | 1117113 | 8/2003 |
| CN | 102382587 | 3/2012 |
| CN | 102576836 | 7/2012 |
| JP | 2002-060489 | 2/2002 |
| JP | 2012-036382 | 2/2012 |
| JP | 2013-020875 | 1/2013 |
| WO | WO 2012/165609 | 12/2012 |
| WO | 2013/035806 | 3/2013 |
| WO | 2013/108890 | 7/2013 |

OTHER PUBLICATIONS

Chinese Office Action dated Jul. 23, 2018 in corresponding Chinese Patent Application No. 201580028065 with English translation of Chinese Office Action.
Extended European Search Report—E 15 80 3159—dated Nov. 15, 2017.
Hitachi Chemical Technical Report, vol. 45 (Jul. 2005); Anode Binder Resin for Lithium Ion Batteries; Kiyotaka Mashita, et al., pp. 7-10.
International Search Report, PCT/JP2015/066278, dated Aug. 25, 2015.

*Primary Examiner* — Wyatt P McConnell
(74) *Attorney, Agent, or Firm* — Young & Thompson

(57) ABSTRACT

Disclosed is a method for manufacturing an electrode by forming an electrode mixture layer on a surface of a current collector using an electrode mixture composition containing an aqueous polyimide precursor solution composition and a specific crosslinking agent, the aqueous polyimide precursor solution composition being obtained by dissolving a specific polyamide acid in an aqueous solvent together with a specific imidazole, and subsequently performing heat treatment to remove the solvent and perform an imidization reaction of the polyamide acid. It is preferable that the imidazole is an imidazole selected from the group consisting of 1,2-dimethylimidazole, 2-ethyl-4-methylimidazole, 4-ethyl-2-methylimidazole, and 1-methyl-4-ethylimidazole.

12 Claims, No Drawings

# ELECTRODE MANUFACTURING METHOD

TECHNICAL FIELD

The present invention relates to a method for manufacturing an electrode of an electrochemical element such as a lithium ion secondary battery, and particularly relates to a method for manufacturing an electrode using a binder including a polyamide acid.

BACKGROUND ART

Lithium ion secondary batteries have high energy density and high capacity, and thus are widely used as driving power sources for mobile data terminals and the like. In recent years, the use of lithium ion secondary batteries for industrial applications, for example, installation in electric and hybrid automobiles that require large capacity, is also increasing, and studies for increasing the capacity and performance even more are conducted. One of such studies attempts to increase the charge and discharge capacity using silicon or tin, which can occlude a large amount of lithium per unit volume, or an alloy containing silicon or tin, as an active material for a negative electrode.

However, when an active material having a large charge and discharge capacity, such as silicon, tin, or an alloy containing silicon or tin, for example, is used, the active material significantly changes its volume in accordance with charging and discharging. For this reason, if polyvinylidene fluoride or a rubber resin, which are used for conventional electrodes, is used as a binding agent (binder), the problem arises in that due to breakage of an active material layer or the occurrence of detachment at an interface between a current collector and the active material layer, a current collecting structure of the electrode may be broken, and thus the cycle characteristics of the battery may easily deteriorate.

Thus, there is a demand for a binder for an electrode, the binder being unlikely to cause breakage or detachment of an electrode even when a significant change in volume occurs and having high toughness in a battery environment. Patent Literature 1 discloses that when a polyimide resin is used as a binding agent for a negative electrode of a lithium secondary battery, the battery capacity hardly decreases even after repeated charge-discharge cycles, and thus a long cycle life is achieved. According to this document, the electrode is manufactured by performing heat treatment at 350° C. for 2 hours (see Examples 1 and 2).

Patent Literature 2 discloses a binder resin composition for an electrode, the binder resin composition including a specific polyamic acid and a solvent and exhibiting a low degree of swelling in an electrolyte solution and excellent toughness (high breaking elongation and breaking energy). Moreover, it is disclosed that during manufacturing of the electrode, heat treatment at a relatively high temperature is required so that an imidization reaction proceeds to a sufficient extent.

Patent Literature 3 discloses a resin composition for an electrode of a lithium ion secondary battery, the resin composition containing a polyimide resin having a carboxyl group and an epoxy resin.

These polyamic acid solution compositions require the use of organic solvents, and heat treatment at high temperatures. Therefore, these polyamic acid solution compositions cannot be said environmentally preferable, and there have been cases where their applications are limited. In view of this, it has been proposed to use water-soluble polyimide precursors. For example, Patent Literature 4 discloses a method for manufacturing an electrode using an aqueous polyimide precursor solution composition obtained by dissolving a polyamic acid in an aqueous solvent together with an imidazole in an amount of 1.6 moles or more per mole of a tetracarboxylic acid component of the polyamic acid, the imidazole having two or more alkyl groups as substituents.

Moreover, Non-Patent Literature 1 states that a lower degree of swelling of a binder resin for an electrode in an electrolyte solution leads to a higher discharge capacity retention after charge-discharge cycles and is thus preferred.

CITATION LIST

Patent Literatures

Patent Literature 1: U.S. Pat. No. 5,468,571
Patent Literature 2: US 2012/168688A1
Patent Literature 3: JP 2013-20875A
Patent Literature 4: US 2013/171520A1

Non-Patent Literatures

Non-Patent Literature 1: HITACHI CHEMICAL TECHNICAL REPORT Vol. 45 (July, 2005)

SUMMARY OF INVENTION

Technical Problem

To manufacture an electrode using polyimide as a binder, special equipment and environment are necessary because an extremely high heating temperature is required. For this reason, it is desirable that an electrode is manufactured by performing heat treatment at a relatively low temperature that is as low as the heating temperature used for an ordinary binder, such as polyvinylidene fluoride or a rubber resin, for a short period of time.

Moreover, with the recent trend toward extremely thinner current collectors (copper foil etc.) for batteries, current collectors having a thickness of 10 µm or less have come to be used. If such current collectors are exposed to a high temperature in electrode manufacturing processes, a considerable reduction in mechanical strength and other problems arise. Thus, it is desirable that heat treatment is performed at a relatively low temperature of 200° C. or less.

Furthermore, there is concern about environmental impacts of the use of organic solvents in an electrode manufacturing step, and therefore, a manufacturing process in which no organic solvent is used and which has good environmental adaptability is demanded.

That is to say, an object of the present invention is to propose a method for manufacturing an electrode, the method using water as a solvent and enabling a high-performance electrode for a lithium secondary battery to be easily obtained by heat treatment at a relatively low temperature of 200° C. or less and for a relatively short period of time, the electrode exhibiting a low degree of swelling and being capable of maintaining excellent adhesion and toughness even in a battery environment, and the method also having favorable environmental adaptability.

Solution to Problem

As a result of extensive studies, the inventors of the present application found that the use of an electrode mixture composition containing an aqueous polyimide precursor solution composition and a specific crosslinking agent, the aqueous polyimide precursor solution composition being obtained by dissolving a polyamide acid of a specific chemical structure in an aqueous solvent together with a specific imidazole, makes it possible that a high-performance electrode for a lithium secondary battery, the electrode exhibiting a low degree of swelling and being capable of maintaining excellent adhesion and toughness even in a battery environment, can be easily obtained even when the electrode is manufactured by performing heat treatment at a relatively low temperature of 200° C. or less for a relatively short period of time, and thus accomplished the present invention.

The present invention relates to the following articles.

1. A method for manufacturing an electrode, the method comprising forming an electrode mixture layer on a surface of a current collector using an electrode mixture composition containing at least an electrode active material, an aqueous polyimide precursor solution composition, and a crosslinking agent, the aqueous polyimide precursor solution composition being obtained by dissolving a polyamide acid having a repeating unit represented by a formula (1) below in an aqueous solvent together with an imidazole in an amount of 1.6 moles or more per mole of a tetracarboxylic acid component of the polyamide acid, the imidazole having two or more alkyl groups as substituents, and the crosslinking agent having a carbodiimide group or an oxazoline group; and subsequently performing heat treatment to remove the solvent and perform an imidization reaction of the polyamide acid,

[Chemical Formula 1]

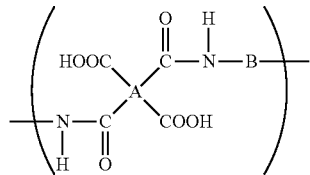

(1)

wherein in the formula (1), A includes at least one tetravalent group selected from the group consisting of tetravalent groups represented by formulae (2), (3), and (4) below, and B includes at least one divalent group selected from the group consisting of divalent groups represented by formulae (5), (6), (7), and (8) below and divalent saturated hydrocarbon groups having 4 to 10 carbon atoms and at least one divalent group selected from the group consisting of divalent groups represented by formulae (9) and (10) below,

[Chemical Formula 2]

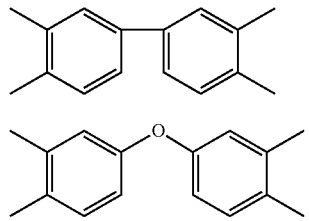

(2)

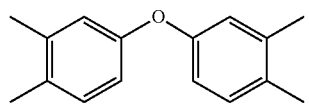

(3)

[Chemical Formula 3]

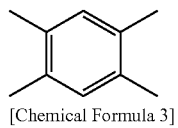

(4)

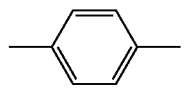

(5)

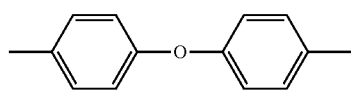

(6)

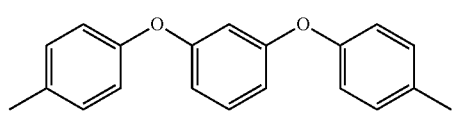

(7)

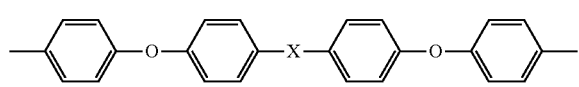

(8)

wherein in the formula (8), X is any of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfonediphenoxy group, and

[Chemical Formula 4]

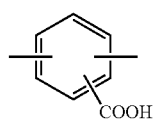

(9)

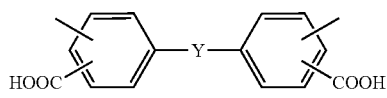

(10)

wherein in the formula (10), Y is any of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfonediphenoxy group.

2. The method for manufacturing an electrode according to clause 1, wherein the imidazole having two or more alkyl groups as substituents is an imidazole selected from the group consisting of 1,2-dimethylimidazole, 2-ethyl-4-methylimidazole, 4-ethyl-2-methylimidazole, and 1-methyl-4-ethylimidazole.

3. The method for manufacturing an electrode according to clause 1 or 2, wherein the electrode active material is carbon powder, silicon powder, tin powder, or alloy powder containing silicon or tin.

4. The method for manufacturing an electrode according to any one of clauses 1 to 3, wherein the electrode active material is a lithium transition metal oxide.

5. The method for manufacturing an electrode according to any one of clauses 1 to 4, wherein an electrode for a lithium ion secondary battery is obtained.

Advantageous Effects of Invention

According to the present invention, it is possible to easily obtain a high-performance electrode for a lithium secondary battery, the electrode exhibiting a low degree of swelling and being capable of maintaining excellent adhesion and toughness even in a battery environment while using polyimide as a binder, by performing heat treatment at a relatively low temperature of 200° C. or less for a relatively short period of time. Moreover, since an aqueous solvent is used, the environmental adaptability is also favorable.

DESCRIPTION OF EMBODIMENTS

With the method for manufacturing an electrode according to the present invention, an electrode (negative electrode and positive electrode) especially for a lithium secondary battery can be advantageously manufactured. Hereinafter, the present invention will be described based on a method for manufacturing an electrode especially for a lithium secondary battery. The present invention, however, is not limited thereto.

In the present invention, it is preferable that a current collector is an electrically conductive metal foil that is usually used for a battery. Preferred examples of the electrically conductive metal foil include foils of metals having electrical conductivity, such as copper, aluminum, nickel, stainless steel (iron), titanium, and cobalt, or of alloys including combinations of these metals. In particular, for lithium secondary batteries, a foil of copper or a copper alloy having a thickness of about 5 to 100 μm is preferable as a current collector of a negative electrode, and an aluminum foil having a thickness of about 5 to 100 μm is preferable as a current collector of a positive electrode, because of the ease of processing into thin foil films, inexpensiveness, the ease of enhancement of the performance of electrodes, and the like.

The current collector, the surface roughness of which is adjusted as necessary, may also have a shape other than a foil shape, such as a flat plate shape, a mesh shape, a net shape, a lath shape, a perforated metal shape, and an embossed shape.

An electrode mixture composition (electrode mixture paste) used in the present invention contains at least an electrode active material, an aqueous polyimide precursor solution composition, and a crosslinking agent having a carbodiimide group or an oxazoline group. The aqueous polyimide precursor solution composition is obtained by dissolving a polyamide acid having a specific repeating unit in an aqueous solvent together with a specific imidazole.

The electrode active material of the electrode mixture composition used in the present invention is not limited as long as it is an electrode active material that is usually used for batteries. For a negative electrode, the electrode active material can be any material into and from which lithium can be electrochemically inserted and removed, and examples of such material include carbon powder, such as graphite, coke, carbon black, and pyrolytic carbon, silicon powder, tin powder, or alloy powder containing silicon or tin. The alloy powder is preferably an intermetallic compound including silicon or tin and a metallic element, and the metallic element is preferably a transition metal such as nickel, titanium, iron, cobalt, copper, zirconium, and manganese. For a positive electrode, the electrode active material can be any material which has lithium element and from and into which lithium can be electrochemically removed and inserted, and preferred examples of such material include lithium transition metal oxides such as $LiCoO_2$, $LiNiO_2$, $LiMnO_2$, $LiCo_{0.5}Mn_{0.5}O_2$, and $LiNi_{0.7}Co_{0.2}Mn_{0.1}O_2$.

According to the present invention, a polyamide acid having a repeating unit of the above-described formula (1) is used.

This polyamide acid can be easily prepared by reacting a tetracarboxylic acid component with a diamine component in a solvent, the reaction being performed at a low temperature in order to suppress an imidization reaction.

The tetracarboxylic acid component refers to tetracarboxylic acids, that is, a tetracarboxylic acid, a dianhydride thereof, an esterified compound thereof, and the like, and preferably is a dianhydride.

In the polyamide acid having the repeating unit represented by the formula (1), at least one tetravalent group selected from the group consisting of tetravalent groups represented by the above-described formulae (2), (3), and (4) is used as a tetravalent group represented by A. Such a tetravalent group is derived from a tetracarboxylic acid. In the following description, a tetracarboxylic acid from which such a tetravalent group is derived will be referred to as "tetracarboxylic acid component". The tetracarboxylic acid component constituting the polyamide acid used in the present invention preferably is at least one type of tetracarboxylic acid selected from the group consisting of 4,4'-oxydiphthalic acids, 3,3',4,4'-biphenyltetracarboxylic acids, and pyromellitic acids, and preferably a 3,3',4,4'-biphenyltetracarboxylic acid or a mixture including a combination of a 4,4'-oxydiphthalic acid with a 3,3',4,4'-biphenyltetracarboxylic acid and/or a pyromellitic acid. Preferably, the mixture is a mixture including a combination of a 4,4'-oxydiphthalic acid in an amount of 10 to 90 mol % or more particularly 20 to 60 mol % with a 3,3',4,4'-biphenyltetracarboxylic acid and/or a pyromellitic acid in an amount of 90 to 10 mol % or more particularly 80 to 40 mol %.

In the polyamide acid having the repeating unit represented by the formula (1), at least one divalent group selected from the group consisting of divalent groups represented by the above-described formulae (5), (6), (7), and (8) and divalent saturated hydrocarbon groups having 4 to 10 carbon atoms is used as a divalent group represented by B. Such a divalent group is derived from a diamine. In the following description, a diamine from which such a divalent group is derived will be referred to as "diamine component". The diamine component constituting the polyamide acid used in the present invention preferably includes at least one type of diamine selected from the group consisting of aromatic diamines having 1 to 4 aromatic rings and aliphatic diamines having 4 to 10 carbon atoms. Preferred examples of the aromatic diamines having 1 to 4 aromatic rings include: aromatic diamines having a single aromatic ring, such as p-phenylenediamine, m-phenylenediamine, 2,4-di-aminotoluene, 2,4-bis(β-amino-tert-butyl)toluene, bis-p-(1,1-dimethyl-5-amino-pentyl)benzene, 1-isopropyl-2,4-m-phenylenediamine, m-xylylenediamine, and p-xylylenediamine; aromatic diamines having two aromatic rings, such as 4,4'-diaminodiphenyl ether, 4,4'-diaminodiphenyl methane, 3,3'-diaminodiphenyl methane, 3,3'-dichlorobenzidine, 4,4'-diaminodiphenyl sulfide, 3,3'-diaminodiphenyl sulfone, 1,5-diaminonaphthalene, 3,3'-dimethyl-4,4'-biphenyldiamine, benzidine, 3,3'-dimethylbenzidine, 3,3'-dimethoxybenzidine, 4,4'-diaminodiphenyl sulfone, 4,4'-diaminodiphenyl propane, bis(4-amino-3-carboxyphenyl) methane, and bis(p-β-amino-tert-butylphenyl)ether; aromatic diamines having three aromatic rings, such as 1,3-bis(4-aminophenoxy)benzene, 1,4-bis(4-aminophenoxy)benzene, and bis(p-β-methyl-6-aminophenyl)benzene; and aromatic diamines having four aromatic rings, such as 2,2-bis[4-(4-aminophenoxy)phenyl]propane, bis[4-(4-aminophenoxy)phenyl]sulfone, and 4,4'-bis(4-aminophenoxy)biphenyl.

Moreover, as the aromatic diamines having four aromatic rings, aromatic diamines represented by a formula (8) below are preferable.

[Chemical Formula 5]

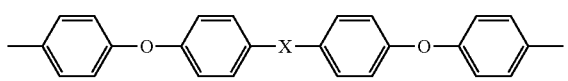

(8)

In the formula (8), X is any of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfonediphenoxy group.

Preferred examples of the aliphatic diamines having 4 to 10 carbon atoms include diamines such as 1,4-diaminobutane, 1,3-diaminopentane, 1,5-diaminopentane, 1,6-diaminohexane (hexamethylenediamine), 1,7-diaminoheptane, 1,8-diaminooctane, 1,9-diaminononane, and 1,10-diaminodecane.

The diamine component constituting the polyamide acid used in the present invention contains at least one type of diamine selected from the above-described aromatic diamines having 1 to 4 aromatic rings in an amount of 50 to 99 mol %, preferably 70 to 97 mol %, and more preferably 80 to 95 mol %.

In the present invention, as the divalent group represented by B of the polyamide acid having the repeating unit represented by the formula (1), in addition to at least one divalent group selected from the group consisting of divalent groups represented by the above-described formulae (5), (6), (7), and (8) as well as divalent saturated hydrocarbon groups having 4 to 10 carbon atoms, at least one divalent group derived from a diamine having a polar group is used. More specifically, the diamine component constituting the polyamide acid used in the present invention further contains a diamine having a polar group in an amount of 1 to 50 mol %, preferably 3 to 30 mol %, and more preferably 5 to 20 mol %. An aromatic diamine having a polar group such as a hydroxyl group or a carboxyl group, the polar group being reactive with an epoxy resin or the like, in the molecule is preferable as the diamine having a polar group.

Examples of the aromatic diamine having a polar group include diamine compounds having a hydroxyl group, such as diaminophenol compounds such as 2,4-diaminophenol; hydroxybiphenyl compounds such as 3,3'-diamino-4,4'-dihydroxybiphenyl, 4,4'-diamino-3,3'-dihydroxybiphenyl, 4,4'-diamino-2,2'-dihydroxybiphenyl, and 4,4'-diamino-2,2',5,5'-tetrahydroxybiphenyl; hydroxydiphenylalkane compounds such as 3,3'-diamino-4,4'-dihydroxydiphenylmethane, 4,4'-diamino-3,3'-dihydroxydiphenylmethane, 4,4'-diamino-2,2'-dihydroxydiphenylmethane, 2,2-bis[3-amino-4-hydroxyphenyl]propane, 2,2-bis[4-amino-3-hydroxyphenyl]propane, 2,2-bis[3-amino-4-hydroxyphenyl]hexafluoropropane, and 4,4'-diamino-2,2',5,5'-tetrahydroxydiphenylmethane; hydroxydiphenyl ether compounds such as 3,3'-diamino-4,4'-dihydroxydiphenyl ether, 4,4'-diamino-3,3'-dihydroxydiphenyl ether, 4,4'-diamino-2,2'-dihydroxydiphenyl ether, and 4,4'-diamino-2,2',5,5'-tetrahydroxydiphenyl ether; hydroxydiphenyl sulfone compounds such as 3,3'-diamino-4,4'-dihydroxydiphenyl sulfone, 4,4'-diamino-3,3'-dihydroxydiphenyl sulfone, 4,4'-diamino-2,2'-dihydroxydiphenyl sulfone, and 4,4'-diamino-2,2',5,5'-tetrahydroxydiphenyl sulfone; bis(hydroxyphenoxyphenyl)alkane compounds such as 2,2-bis[4-(4-amino-3-hydroxyphenoxy)phenyl]propane; bis(hydroxyphenoxy)biphenyl compounds such as 4,4'-bis(4-amino-3-hydroxyphenoxy)biphenyl; and bis(hydroxyphenoxyphenyl)sulfone compounds such as 2,2-bis[4-(4-amino-3-hydroxyphenoxy)phenyl]sulfone.

Examples of the aromatic diamine having a polar group further include diamine compounds having a carboxyl group, such as benzencarboxylic acids such as 3,5-diaminobenzoic acid and 2,4-diaminobenzoic acid; carboxybiphenyl compounds such as 3,3'-diamino-4,4'-dicarboxybiphenyl, 4,4'-diamino-3,3'-dicarboxybiphenyl, 4,4'-diamino-2,2'-dicarboxybiphenyl, and 4,4'-diamino-2,2',5,5'-tetracarboxybiphenyl; carboxydiphenylalkane compounds such as 3,3'-diamino-4,4'-dicarboxydiphenylmethane, 4,4'-diamino-3,3'-dicarboxydiphenylmethane, 4,4'-diamino-2,2'-dicarboxydiphenylmethane, 2,2-bis[3-amino-4-carboxyphenyl]propane, 2,2-bis[4-amino-3-carboxyphenyl]propane, 2,2-bis[3-amino-4-carboxyphenyl]hexafluoropropane, and 4,4'-diamino-2,2',5,5'-tetracarboxybiphenyl; carboxydiphenyl ether compounds such as 3,3'-diamino-4,4'-dicarboxydiphenyl ether, 4,4'-diamino-3,3'-dicarboxydiphenyl ether, 4,4'-diamino-2,2'-dicarboxydiphenyl ether, and 4,4'-diamino-2,2',5,5'-tetracarboxydiphenyl ether; carboxydiphenyl sulfone compounds such as 3,3'-diamino-4,4'-dicarboxydiphenyl sulfone, 4,4'-diamino-3,3'-dicarboxydiphenyl sulfone, and 4,4'-diamino-2,2'5,5'-tetracarboxydiphenyl sulfone; bis(carboxyphenoxyphenyl)alkane compounds such as 2,2-bis[4-(4-amino-3-carboxyphenoxy)phenyl]propane bis (carboxyphenoxy)biphenyl compounds such as 4,4'-bis(4-amino-3-carboxyphenoxy)biphenyl; and bis(carboxyphenoxyphenyl)sulfone compounds such as 2,2-bis[4-(4-amino-3-carboxyphenoxy)phenyl]sulfone.

As the diamine compounds having a carboxyl group, aromatic diamines represented by formulae (9) and (10) below are preferable.

[Chemical Formula 6]

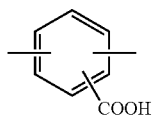
(9)

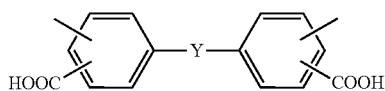
(10)

In the formula (10), Y is any of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfonediphenoxy group.

Preferably, the diamine component constituting the polyamide acid used in the present invention especially includes, among the above-described diamines, at least one type of diamine selected from the group consisting of p-phenylenediamine, 4,4'-diaminodiphenyl ether, 1,3-bis(4-aminophenoxy)benzene, 2,2-bis[4-(4-aminophenoxy)phenyl]propane, bis[4-(4-aminophenoxy)phenyl]sulfone, 4,4'-bis(4-aminophenoxy)biphenyl, and hexamethylenediamine and at least one type of diamine selected from the group consisting of 4,4'-diamino-3,3'-dihydroxybiphenyl, 3,5-diaminobenzoic acid, and 4,4'-diamino-3,3'-dicarboxydiphenylmethane.

It is important that the molar ratio [tetracarboxylic acid component/diamine component] between the tetracarboxylic acid component and the diamine component that constitute the polyamide acid used in the present invention is set to a substantially equimolar ratio, specifically 0.95 to 1.05 and preferably 0.97 to 1.03. A molar ratio outside this molar ratio range may result in a polyimide resin having reduced toughness.

Preferably, as the imidazole (compound) used in the present invention, the imidazole having two or more alkyl groups as substituents, a compound represented by a formula (11) below is preferable.

[Chemical Formula 7]

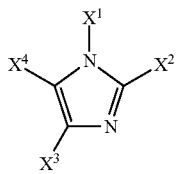
(11)

In the formula (11), $X^1$ to $X^4$ are each independently a hydrogen atom or an alkyl group having 1 to 5 carbon atoms, and at least two of $X^1$ to $X^4$ are alkyl groups having 1 to 5 carbon atoms.

Imidazoles having two or more alkyl groups as substituents are highly soluble in water. Therefore, the use of these imidazoles makes it possible to easily manufacture polyimide precursor compositions. Preferable examples of these imidazoles include 1,2-dimethylimidazole, 2-ethyl-4-methylimidazole, 4-ethyl-2-methylimidazole, and 1-methyl-4-ethylimidazole.

The amount of the imidazole that is used in the present invention, the imidazole having two or more alkyl groups as substituents, is preferably 0.8 times equivalent or more, more preferably 1.0 times equivalent or more, and even more preferably 1.2 times equivalent or more of the amount of carboxyl groups of the polyamide acid that is generated by reacting the raw materials, that is, a tetracarboxylic dianhydride and a diamine. If the amount of the imidazole used is less than 0.8 times equivalent of the amount of the carboxyl groups of the polyamide acid, it may be not easy to obtain a uniform aqueous polyimide precursor solution composition. Moreover, the upper limit of the amount of the imidazole used is usually, but not limited to, less than 10 times equivalent, preferably less than 5 times equivalent, and more preferably less than 3 times equivalent. Use of the imidazole in an excessively large amount is uneconomical and also may result in poor storage stability of the composition.

According to the present invention, the wording "times equivalent of the amount of the carboxyl groups of the polyamide acid", which defines the amount of imidazole, refers to what amount of imidazole (what number of imidazole molecules) is used per carboxyl group forming an amide acid group of the polyamide acid. Note that the number of carboxyl groups forming an amide acid group of the polyamide acid is calculated on the assumption that two carboxyl groups are formed per molecule of the tetracarboxylic acid component constituting the raw material.

Accordingly, the amount of the imidazole that is used in the present invention is preferably 1.6 moles or more, more preferably 2.0 moles or more, and even more preferably 2.4 moles or more per mole of the tetracarboxylic acid component of the polyamide acid, that is, the tetracarboxylic dianhydride constituting the raw material. Moreover, the upper limit of the amount of the imidazole used is usually less than 20 moles, preferably less than 10 moles, and more preferably less than 6 moles per mole of the tetracarboxylic acid component.

The imidazole used in the present invention has the following features: the imidazole not only increases the solubility of the polyamide acid in water by forming a salt with the carboxyl groups of the polyamide acid but has an extremely high catalytic action in imidization (dehydration and cyclization) of a polyimide precursor to give a polyimide. Consequently, with the aqueous polyimide precursor solution composition of the present invention, an aromatic polyimide having extremely excellent properties can be obtained easily even by, for example, performing heat treatment at a lower temperature for a shorter period of time.

The aqueous polyimide precursor solution composition used in the present invention can also be obtained using the following methods:

(i) A polyamide acid obtained by reacting a tetracarboxylic acid component with a diamine component in an organic solvent serving as a reaction solvent is placed in water to obtain polyamide acid powder, and the polyamide acid powder is mixed and dissolved in an aqueous solvent together with an imidazole (preferably, an imidazole having two or more alkyl groups) to obtain an aqueous solution composition;
(ii) A water-soluble polyimide precursor is obtained by reacting a tetracarboxylic acid component with a diamine component in the presence of an imidazole (preferably, an imidazole having two or more alkyl groups) in an organic solvent serving as a reaction solvent, and the water-soluble polyimide precursor is separated and then dissolved in an aqueous solvent: or
(iii) A polyamide acid is obtained by reacting a tetracarboxylic acid component with a diamine component in an organic solvent serving as a reaction solvent, the polyamide acid is reacted with an imidazole (preferably, an imidazole having two or more alkyl groups) in an organic solvent serving as a reaction solvent to obtain a water-soluble polyimide precursor, and the water-soluble polyimide precursor is separated and then dissolved in an aqueous solvent.

However, as described above, in light of obtaining an aqueous polyimide precursor solution composition containing an extremely small amount of organic solvent or even no organic solvent, it is not preferable to prepare a polyimide precursor in an organic solvent.

The aqueous polyimide precursor solution composition used in the present invention can be extremely easily (directly) manufactured preferably by reacting a tetracarboxylic acid component with a diamine component in the presence of an imidazole having two or more alkyl groups as substituents in water serving as a reaction solvent. In this reaction, the tetracarboxylic acid component and the diamine component are used in substantially equimolar amounts, and the reaction is performed at a relatively low temperature of not more than 100° C. and preferably not more than 80° C. in order to suppress the imidization reaction. Usually, the reaction temperature is 25° C. to 100° C., preferably 40° C. to 80° C., and more preferably 50° C. to 80° C., and a preferable reaction time is about 0.1 to 24 hours and preferably about 2 to 12 hours; however, the reaction temperature and the reaction time are not limited to these values. Setting the reaction temperature and the reaction time within the aforementioned ranges makes it possible for an aqueous polyimide precursor solution composition having a high molecular weight to be easily obtained with high production efficiency. Note that although the reaction can be performed in air atmosphere, the reaction usually is preferably performed in an inert gas or nitrogen gas atmosphere.

It is preferable that the aqueous polyimide precursor solution composition used in the present invention has a high molecular weight so that the logarithmic viscosity thereof is not less than 0.2, preferably not less than 0.4, more preferably not less than 0.6, further preferably not less than 0.8, and particularly preferably not less than, or more than, 1.0, the logarithmic viscosity being measured at a temperature of 30° C. and a concentration of 0.5 g/100 mL (dissolved in water) based on the solid concentration attributable to the polyimide precursor (substantially, the polyamide acid). The polyimide precursor having a logarithmic viscosity below the aforementioned range has a low molecular weight, and thus, it may be difficult to obtain a polyimide having excellent characteristics even when the aqueous polyimide precursor solution composition of the present invention is used.

Although an aqueous solvent is used for the aqueous polyimide precursor solution composition used in the present invention, it is also possible to use a known organic solvent other than water, which is used in preparation of the polyamide acid, in a proportion of not more than 50 mass %, preferably not more than 30 mass %, and more preferably not more than 10 mass % in the total of solvents.

The wording "in water serving as a reaction solvent" means that water is used as a main component of the solvent. Accordingly, an organic solvent other than water may also be used in a proportion of not more than 50 mass %, preferably not more than 30 mass %, and more preferably not more than 10 mass % in the total of solvents. Note that the organic solvent as used herein does not include the tetracarboxylic acid component such as a tetracarboxylic dianhydride, the diamine component, the polyimide precursor such as a polyamide acid, and the imidazole.

Examples of the aforementioned organic solvent include N,N-dimethylformamide, N,N-dimethylacetamide, N,N-diethylacetamide, N-methyl-2-pyrrolidone, N-ethyl-2-pyrrolidone, 1,3-dimethyl-2-imidazolidinone, N-methylcaprolactam, hexamethylphosphorotriamide, 1,2-dimethoxyethane, bis(2-methoxyethyl)ether, 1,2-bis(2-methoxyethoxy)ethane, tetrahydrofuran, bis[2-(2-methoxyethoxy)ethyl]ether, 1,4-dioxane, dimethyl sulfoxide, dimethyl sulfone, diphenyl ether, sulfolane, diphenyl sulfone, tetramethylurea, anisole, m-cresol, phenol, γ-butyrolactone, and the like.

In the method for manufacturing the aqueous polyimide precursor solution composition used in the present invention, in view of high environmental adaptability, the reaction solvent is preferably a solvent having an organic solvent content of less than 5% and particularly preferably an aqueous solvent containing no organic solvent except for water. The composition of the reaction solvent can be appropriately selected in accordance with a desired solvent composition for the aqueous polyimide precursor solution composition to be manufactured, and there are cases where it is preferable that the composition of the reaction solvent is the same as the desired solvent composition for the aqueous polyimide precursor solution composition.

In the aqueous polyimide precursor solution composition used in the present invention, it is preferable that the solid concentration attributable to the polyimide precursor (substantially, the polyamide acid) is preferably 5 mass % to 45 mass %, more preferably 7 mass % to 40 mass %, and even more preferably 9 mass % to 30 mass %, without limitation, with respect to the total amount of the polyimide precursor and the solvent. If the solid concentration is lower than 5 mass %, the productivity may be significantly poor, and if the solid concentration is higher than 45 mass %, the solution may have no fluidity. Moreover, it is preferable that the solution viscosity at 30° C. of the aqueous polyimide precursor solution composition of the present invention is preferably 1000 Pa·sec or less, more preferably 0.5 to 500 Pa·sec, even more preferably 1 to 300 Pa·sec, and particularly preferably 3 to 200 Pa·sec, without limitation, in view of handling.

If the solution viscosity exceeds 1000 Pa·sec, the solution has no fluidity, and thus uniform application thereof to metal, glass, and the like is difficult. If the solution viscosity is lower than 0.5 Pa·sec, dripping, repelling, or the like disadvantageously occurs during application to metal, glass, and the like, and also there are cases where it is difficult to obtain an aromatic polyimide having excellent characteristics.

An aromatic polyimide can preferably be obtained from the aqueous polyimide precursor solution composition used in the present invention by removing the aqueous solvent and also performing imidization (dehydration and cyclization) usually by heat treatment. Although the conditions for the heat treatment are not limited to specific conditions, the heat treatment is performed generally at a temperature of 100° C. or more, preferably at a temperature of 120° C. to 600° C., and more preferably at a temperature of 150° C. to 500° C. for 0.01 hours to 30 hours and preferably for 0.01 to 10 hours.

The characteristics of the aromatic polyimide that is obtained using the aqueous polyimide precursor solution of the present invention are by no means inferior to those of a polyimide precursor (polyamide acid) solution composition that is obtained using an ordinary organic solvent and merely by performing heat treatment at a relatively low temperature (e.g., 150° C. to 300° C., and more preferably 200° C. to 280° C.). Preferably, the aromatic polyimide can exert excellent characteristics such as a high ability to bond to metals and the like.

Preferably, the electrode mixture composition used in the present invention further contains a crosslinking agent having a carbodiimide group or an oxazoline group, in addition to the electrode active material and the aqueous polyimide precursor solution composition, because this makes it possible to suppress a reduction in the bonding strength between an electrode mixture layer and the current collector when they come into contact with an electrolyte solution. An example of the crosslinking agent having a carbodiimide group is a carbodiimide group-containing resin such as polycarbodiimide. Moreover, examples of the crosslinking agent having an oxazoline group include 1,3-phenylenebisoxazoline and resins containing an oxazoline group. The amount of the crosslinking agent to be added is preferably 0.05 to 5 mass % and more preferably 0.1 to 3 mass % with respect to the amount of the polyamide acid.

Preferably, the electrode mixture composition used in the present invention further contains a pyridine compound, because this makes it possible to reduce the degree of swelling of the resultant polyimide binder in an electrolyte solution even more and increase the breaking elongation and the breaking energy even more and, furthermore, to reduce the heating time of the heat treatment for obtaining an electrode and reduce the heating temperature to an even lower temperature.

The pyridine compound refers to a compound having a pyridine skeleton in its chemical structure, and preferred examples thereof include pyridine, 3-pyridinol, quinoline, isoquinoline, quinoxaline, 6-tert-butylquinoline, acridine, 6-quinolinecarboxylic acid, 3,4-lutidine, and pyridazine. These pyridine compounds can be used alone or in combination of two or more.

The amount of the pyridine compound to be added is, but not limited to, preferably 0.05 to 2.0 molar equivalent and more preferably 0.1 to 1.0 molar equivalent with respect to the amount of the amide acid structure (per mol of the amide acid structure) of the polyamide acid. If the amount of the pyridine compound that is added is outside this range, it may be difficult to achieve the effects, which are provided by the addition of the pyridine compound, of reducing the degree of swelling of the resin in the electrolyte solution even more and increasing the breaking elongation and the breaking energy of the resulting polyimide binder even more, and furthermore suppressing the heating temperature of the heat treatment for obtaining an electrode to an even lower temperature.

The electrode mixture composition used in the present invention can advantageously contain additives, such as a surfactant, a viscosity modifier (thickener), and a conductive aid (conductive agent), for example, that are contained in ordinary electrode mixture compositions. Moreover, in the electrode mixture composition used in the present invention, an additional binder component, other than the polyamide acid, including polyvinylidene fluoride or a rubber resin may also be mixed and used with the polyamide acid. It is preferable that such an additional binder component is contained in a proportion of less than 50 mass %, preferably less than 30 mass %, and more preferably less than 10 mass % with respect to 100 mass % of the binder components.

The electrode mixture composition used in the present invention is preferably obtained in slurry form by adding the crosslinking agent, the electrode active material, and other components if necessary, to the aqueous polyimide precursor solution composition, and sufficiently kneading the resultant mixture. The amount of the electrode active material in the electrode mixture composition is not particularly limited, but is usually 0.1 to 1000 times by mass, preferably 1 to 1000 times by mass, more preferably 5 to 1000 times by mass, and even more preferably 10 to 1000 times by mass the solid mass attributable to the polyamide acid. If the amount of the electrode active material is excessively small, the electrode mixture layer formed on the current collector has many inactive portions, and thus the function of the electrode may be insufficient. If the amount of the electrode active material is excessively large, the electrode active material does not sufficiently bind to the current collector and is likely to separate therefrom. It is preferable that mixing is performed so that in the electrode mixture composition of the present invention, the solid content attributable to the polyamide acid occupies 1 to 15 mass % of the total solid content. If this range is exceeded, the performance of the resultant electrode may be low.

In the method for manufacturing an electrode of the present invention, the electrode mixture composition (paste) containing at least the electrode active material, the aqueous polyimide precursor solution composition, and the crosslinking agent is applied to or cast on a surface of the current collector, and thus a layered product in which an electrode mixture layer is formed on the surface of the current collector is obtained. The electrode mixture layer is adjusted to a thickness of about 10 to 300 μm usually after drying. In this step, it is preferable that the electrode mixture composition (paste) is continuously applied to or cast on the surface of the current collector while the current collector is continuously supplied. The electrode mixture layer is formed on one side or both sides of the current collector.

Then, the layered product in which the electrode mixture layer is formed on the surface of the current collector is heated to remove the solvent and convert the amide acid structure of the polyamide acid into an imide structure. Preferably, this heat treatment step is performed with a temperature range from 80° C. to 200° C., preferably from 90° C. to 180° C., and more preferably from 100° C. to 170° C.

At a heating temperature of less than 80° C., the progress of the imidization reaction may be insufficient, or the properties of a molded electrode product may deteriorate. On the other hand, at a heating temperature of more than 200° C., there is a risk that the current collector may deteriorate. The heat treatment may be performed using a method in which the temperature is increased gradually in multiple stages in order to prevent foaming and pulverization. The heating time is preferably within a range from 10 minutes to 48 hours. A heating time of longer than 48 hours is not preferable in terms of productivity, and a heating time of shorter than 10 minutes may result in insufficient imidization reaction and removal of the solvent.

During the heat treatment, most of the solvent is removed, and also the polyamide acid is substantially converted into polyimide by the imidization reaction. The heat treatment can be advantageously performed under a reduced pressure and under an inert gas flow in order to efficiently remove the solvent.

Here, "being substantially converted into polyimide" means that the amide acid structure may remain in polyimide, and it is sufficient if 70% or more, preferably 80% or more, and more preferably 90% or more of the amide acid structure is imidized. Completely imidizing the amide acid structure by heat treatment at a low temperature that is as low as the above-described temperature ranges is not always easy. However, the binder (binder prior to the addition of the electrode active material) of the present invention, which contains a polyamide acid constituted by a repeating unit including a specific tetracarboxylic acid component and a diamine component as well as a crosslinking agent, can develop the following excellent characteristics that are required of a binder for a high-performance battery, by heat treatment at a low temperature that is as low as the above-described temperature ranges. The excellent characteristics are the characteristics of exhibiting a low degree of swelling (the rate of increase in mass due to swelling when immersed in dimethylcarbonate at 25° C. for 24 hours is preferably not more than 2 mass % and more preferably not more than 1 mass %) and being capable of maintaining excellent adhesion (in a state prior to the immersion in dimethylcarbonate, the 90° peel strength with respect to the current collector is not less than 0.5 N/mm and more preferably not less than 0.7 N/mm, the 90° peel strength retention after the immersion in dimethylcarbonate at 25° C. for 24 hours is not less than 80%, more preferably not less than 85%, and even more preferably not less than 90%, and furthermore, in adhesion testing for determining adhesion to the current collector using a cross-cut method in a state prior to the immersion in dimethylcarbonate, detachment is less than 5%, and detachment after the immersion in dimethylcarbonate at 25° C. for 24 hours is also less than 5%) and toughness even in a battery environment.

With an electrode that is obtained using the method for manufacturing an electrode of the present invention, it is possible to advantageously manufacture a battery in accordance with a known method. For example, in the case of a lithium secondary battery, the battery can be advantageously obtained in accordance with an ordinary method, in which a positive electrode and a negative electrode that are obtained are wound into, for example, a cylindrical shape while a separator such as a polyolefin porous body is sandwiched between the positive electrode and the negative electrode, the resultant cylindrical electrode body is used kept in the cylindrical shape or flattened into a flat shape, and this electrode body and a non-aqueous electrolyte solution are inserted into an exterior body.

EXAMPLES

Hereinafter, the present invention will be more specifically described using examples. The examples below show that a binder (binder resin composition) including an aromatic polyamide acid having a repeating unit represented by the formula (1), which characterizes the present invention, sufficiently meets the characteristics that are required of a binder resin for an electrode, even when heat treatment of the binder is performed at a low temperature of 200° C. or less.

Methods for determining the characteristics used in the examples below are as follows:

Solid Concentration

Each sample solution (whose mass is denoted by $w_1$) was heated in a hot-air dryer at 120° C. for 10 minutes, at 250° C. for 10 more minutes, and then at 350° C. for 30 more minutes, and the mass (this mass is denoted by $w_2$) of the sample solution after the heat treatment was measured. The solid concentration [mass %] was calculated from an equation below.

$$\text{Solid concentration[mass \%]} = (w_2/w_1) \times 100$$

Logarithmic Viscosity

Each sample solution was diluted to a concentration of 0.5 g/dl (solvent: NMP) based on the solid concentration. With respect to this diluted solution, the flow time ($T_1$) was measured at 30° C. using a Cannon-Fenske viscometer No. 100. The logarithmic viscosity was calculated from an equation below using the flow time ($T_0$) with respect to blank NMP.

$$\text{Logarithmic viscosity} = \{\ln(T_1/T_0)\}/0.5$$

Solution Viscosity (Rotational Viscosity)

The sample solutions were subjected to measurement at 30° C. using an E-type viscometer manufactured by Tokimec Inc.

Solution Stability

The sample solutions were stored in an atmosphere in which the temperature was adjusted to 25° C., and a sample solution with respect to which the change in solution viscosity after one month was within ±10% was indicated by a circle mark, while a sample solution with respect to which the change in solution viscosity after one month exceeded ±10% was indicated by a cross mark.

Swelling Testing in DMC

A 5 cm square piece cut from an electrode constituted by a copper foil and an electrode mixture layer was used as a sample. The mass of the electrode mixture layer alone was obtained by subtracting the mass of the copper foil by calculation. The degree of swelling S of the electrode mixture layer was measured by swelling testing in a dimethylcarbonate solution described below. That is to say, the mass of the electrode mixture layer after vacuum drying at 25° C. for 24 hours was regarded as dry mass ($W_d$), the mass of the electrode mixture layer after immersion in the dimethylcarbonate (DMC) solution at 25° C. for 24 hours was regarded as swollen mass ($W_w$), and the degree of swelling S was calculated from an equation below.

$$S[\text{mass \%}] = (W_w - W_d)/W_w \times 100$$

Adhesion Testing (Cross-Cut Method)

Adhesion testing was performed in conformity with JIS K 5600-5-6. The evaluations were made visually on a scale from Class 0 to Class 5 (the smaller the number, the stronger the adhesion) in accordance with the evaluation criteria (3).

Note that the adhesion testing was performed on each sample both before and after the swelling testing in the dimethylcarbonate solution.

Measurement of 90° Peel Strength

In 90° peel strength testing, measurement was performed in conformity with IPC-TM650 using a universal testing machine (RTC-1225A manufactured by Orientec Corporation).

90° Peel Strength Retention

With respect to each sample before and after the swelling testing in the dimethylcarbonate solution, the 90° peel strength was measured, and the 90° peel strength retention was calculated from an equation below.

90° peel strength retention[%]=90° peel strength after immersion/90° peel strength before immersion×100

Compounds used in the examples below are abbreviated as follows:
ODPA: 4,4'-oxydiphthalic dianhydride
s-BPDA: 3,3',4,4'-biphenyltetracarboxylic dianhydride
PPD: p-phenylenediamine
ODA: 4,4'-diaminodiphenyl ether
HMD: hexamethylenediamine
3,5-DABA: 3,5-diaminobenzoic acid
MBAA: 4,4'-diamino-3,3'-dicarboxydiphenylmethane
1,3-PBO: 1,3-phenylenebisoxazoline
1,2-DMZ: 1,2-dimethylimidazole

Example 1

First, 450 g of water serving as a solvent was added into a glass reaction vessel having an internal volume of 500 mL and equipped with a stirrer and a nitrogen gas inlet and outlet tube. Then, 18.40 g (0.092 mol) of ODA and 1.55 g (0.010 mol) of 3,5-DABA as well as 24.54 g (1.25 times equivalent of the amount of the carboxyl groups) of 1,2-DMZ were added to the solvent and dissolved by stirring at 25° C. for 1 hour. To this solution was added 30.04 g (0.102 mol) of s-BPDA, followed by stirring at 70° C. for 6 hours to obtain a polyamide acid solution having a solid concentration of 9.6 mass %, a solution viscosity of 4.2 Pa·s, and a logarithmic viscosity of 0.27.

To the obtained polyamide acid solution was added a carbodiimide resin (polycarbodiimide manufactured by Nisshinbo Chemical Inc.) in an amount of 1 mass % relative to the amount of the polyamide acid to obtain a binder resin composition for an electrode.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 170° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 1 shows the results.

Then, 8.3 g of the binder resin composition for an electrode (solid mass after imidization: 0.8 g) and 9.2 g of −325 mesh silicon powder were kneaded together in a mortar in such a manner as to be mashed to prepare an electrode mixture composition (electrode mixture paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 170° C. for 1 hour. Thus, an electrode with an electrode mixture layer having a thickness of 100 μm was produced.

Swelling testing in DMC was performed using the obtained electrode as a sample. Moreover, adhesion testing was performed on the sample before and after the swelling testing in the dimethylcarbonate solution.

Table 1 shows the results.

Example 2

The various kinds of testing were performed in the same manner as in Example 1 except that instead of the carbodiimide resin, 1,3-PBO was added to the binder resin composition for an electrode in an amount of 1 mass %.

Table 1 shows the results.

Example 3

First, 450 g of water serving as a solvent was added into a glass reaction vessel having an internal volume of 500 mL and equipped with a stirrer and a nitrogen gas inlet and outlet tube. Then, 17.91 g (0.089 mol) of ODA and 2.85 g (0.010 mol) of MBAA as well as 23.89 g (1.25 times equivalent of the amount of the carboxyl groups) of 1,2-DMZ were added to the solvent and dissolved by stirring at 25° C. for 1 hour. To this solution was added 29.24 g (0.099 mol) of s-BPDA, followed by stirring at 70° C. for 6 hours to obtain a polyamide acid solution having a solid concentration of 9.5 mass %, a solution viscosity of 3.4 Pa·s, and a logarithmic viscosity of 0.21.

To the obtained polyamide acid solution was added a carbodiimide resin (polycarbodiimide manufactured by Nisshinbo Chemical Inc.) in an amount of 1 mass % relative to the amount of the polyamide acid to obtain a binder resin composition for an electrode.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 170° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 1 shows the results.

Then, 8.4 g of the binder resin composition for an electrode (solid mass after imidization: 0.8 g) and 9.2 g of −325 mesh silicon powder were kneaded together in a mortar in such a manner as to be mashed to prepare an electrode mixture composition (electrode mixture paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 170° C. for 1 hour. Thus, an electrode with an electrode mixture layer having a thickness of 100 μm was produced.

Swelling testing in DMC was performed using the obtained electrode as a sample. Moreover, adhesion testing was performed on the sample before and after the swelling testing in the dimethylcarbonate solution.

Table 1 shows the results.

Example 4

The various kinds of testing were performed in the same manner as in Example 3 except that instead of the carbodiimide resin, 1,3-PBO was added to the binder resin composition for an electrode in an amount of 1 mass %.

Table 1 shows the results.

Example 5

First, 450 g of water serving as a solvent was added into a glass reaction vessel having an internal volume of 500 mL and equipped with a stirrer and a nitrogen gas inlet and outlet tube. Then, 12.16 g (0.105 mol) of HMD and 1.77 g (0.012 mol) of 3,5-DABA as well as 27.95 g (1.25 times equivalent of the amount of the carboxyl groups) of 1,2-DMZ were added to the solvent and dissolved by stirring at 25° C. for 1 hour. To this solution was added 36.07 g (0.116 mol) of ODPA, followed by stirring at 70° C. for 6 hours to obtain a polyamide acid solution having a solid concentration of 9.2 mass %, a solution viscosity of 0.1 Pa·s, and a logarithmic viscosity of 0.27.

To the obtained polyamide acid solution was added a carbodiimide resin (polycarbodiimide manufactured by Nisshinbo Chemical Inc.) in an amount of 1 mass % relative to the amount of the polyamide acid to obtain a binder resin composition for an electrode.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 170° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 1 shows the results.

Then, 8.7 g of the binder resin composition for an electrode (solid mass after imidization: 0.8 g) and 9.2 g of −325 mesh silicon powder were kneaded together in a mortar in such a manner as to be mashed to prepare an electrode mixture composition (electrode mixture paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 170° C. for 1 hour. Thus, an electrode with an electrode mixture layer having a thickness of 100 μm was produced.

Swelling testing in DMC was performed using the obtained electrode as a sample. Moreover, adhesion testing was performed on the sample before and after the swelling testing in the dimethylcarbonate solution.

Table 1 shows the results.

Example 6

The various kinds of testing were performed in the same manner as in Example 5 except that instead of the carbodiimide resin, 1,3-PBO was added to the binder resin composition for an electrode in an amount of 1 mass %.

Table 1 shows the results.

Example 7

First, 450 g of water serving as a solvent was added into a glass reaction vessel having an internal volume of 500 mL and equipped with a stirrer and a nitrogen gas inlet and outlet tube. Then, 11.79 g (0.101 mol) of HMD and 3.23 g (0.011 mol) of MBAA as well as 27.10 g (1.25 times equivalent of the amount of the carboxyl groups) of 1,2-DMZ were added to the solvent and dissolved by stirring at 25° C. for 1 hour. To this solution was added 34.98 g (0.113 mol) of ODPA, followed by stirring at 70° C. for 6 hours to obtain a polyamide acid solution having a solid concentration of 9.4 mass %, a solution viscosity of 0.1 Pa·s, and a logarithmic viscosity of 0.20.

To the obtained polyamide acid solution was added a carbodiimide resin (polycarbodiimide manufactured by Nisshinbo Chemical Inc.) in an amount of 1 mass % relative to the amount of the polyamide acid to obtain a binder resin composition for an electrode.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 170° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 1 shows the results.

Then, 8.5 g of the binder resin composition for an electrode (solid mass after imidization: 0.8 g) and 9.2 g of −325 mesh silicon powder were kneaded together in a mortar in such a manner as to be mashed to prepare an electrode mixture composition (electrode mixture paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 170° C. for 1 hour. Thus, an electrode with an electrode mixture layer having a thickness of 100 μm was produced.

Swelling testing in DMC was performed using the obtained electrode as a sample. Moreover, adhesion testing was performed on the sample before and after the swelling testing in the dimethylcarbonate solution.

Table 1 shows the results.

Example 8

The various kinds of testing were performed in the same manner as in Example 7 except that instead of the carbodiimide resin, 1,3-PBO was added to the binder resin composition for an electrode in an amount of 1 mass %.

Table 1 shows the results.

Example 9

First, 450 g of water serving as a solvent was added into a glass reaction vessel having an internal volume of 500 mL and equipped with a stirrer and a nitrogen gas inlet and outlet tube. Then, 2.26 g (0.021 mol) of PPD, 14.63 g (0.073 mol) of ODA, and 1.59 g (0.010 mol) of 3,5-DABA as well as 25.08 g (1.25 times equivalent of the amount of the carboxyl groups) of 1,2-DMZ were added to the solvent and dissolved by stirring at 25° C. for 1 hour. To this solution were added 15.35 g (0.052 mol) of s-BPDA and 16.18 g (0.052 mol) of ODPA, followed by stirring at 70° C. for 6 hours to obtain a polyamide acid solution having a solid concentration of 9.7 mass %, a solution viscosity of 4.1 Pa·s, and a logarithmic viscosity of 0.42.

To the obtained polyamide acid solution was added a carbodiimide resin (polycarbodiimide manufactured by Nisshinbo Chemical Inc.) in an amount of 1 mass % relative to the amount of the polyamide acid to obtain a binder resin composition for an electrode.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 170° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 1 shows the results.

Then, 8.2 g of the binder resin composition for an electrode (solid mass after imidization: 0.8 g) and 9.2 g of –325 mesh silicon powder were kneaded together in a mortar in such a manner as to be mashed to prepare an electrode mixture composition (electrode mixture paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 170° C. for 1 hour. Thus, an electrode with an electrode mixture layer having a thickness of 100 μm was produced.

Swelling testing in DMC was performed using the obtained electrode as a sample. Moreover, adhesion testing was performed on the sample before and after the swelling testing in the dimethylcarbonate solution.

Table 1 shows the results.

Example 10

The various kinds of testing were performed in the same manner as in Example 9 except that instead of the carbodiimide resin, 1,3-PBO was added to the binder resin composition for an electrode in an amount of 1 mass %.

Table 1 shows the results.

Example 11

First, 450 g of water serving as a solvent was added into a glass reaction vessel having an internal volume of 500 mL and equipped with a stirrer and a nitrogen gas inlet and outlet tube. Then, 2.20 g (0.020 mol) of PPD, 14.23 g (0.071 mol) of ODA, and 2.91 g (0.010 mol) of MBAA as well as 24.40 g (1.25 times equivalent of the amount of the carboxyl groups) of 1,2-DMZ were added to the solvent and dissolved by stirring at 25° C. for 1 hour. To this solution were added 14.93 g (0.051 mol) of s-BPDA and 15.74 g (0.051 mol) of ODPA, followed by stirring at 70° C. for 6 hours to obtain a polyamide acid solution having a solid concentration of 9.5 mass %, a solution viscosity of 3.6 Pa·s, and a logarithmic viscosity of 0.38.

To the obtained polyamide acid solution was added a carbodiimide resin (polycarbodiimide manufactured by Nisshinbo Chemical Inc.) in an amount of 1 mass % relative to the amount of the polyamide acid to obtain a binder resin composition for an electrode.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 170° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 1 shows the results.

Then, 8.4 g of the binder resin composition for an electrode (solid mass after imidization: 0.8 g) and 9.2 g of –325 mesh silicon powder were kneaded together in a mortar in such a manner as to be mashed to prepare an electrode mixture composition (electrode mixture paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 170° C. for 1 hour. Thus, an electrode with an electrode mixture layer having a thickness of 100 μm was produced.

Swelling testing in DMC was performed using the obtained electrode as a sample. Moreover, adhesion testing was performed on the sample before and after the swelling testing in the dimethylcarbonate solution.

Table 1 shows the results.

Example 12

The various kinds of testing were performed in the same manner as in Example 11 except that instead of the carbodiimide resin, 1,3-PBO was added to the binder resin composition for an electrode in an amount of 1 mass %.

Table 1 shows the results.

Comparative Example 1

The various kinds of testing were performed in the same manner as in Example 1 except that the carbodiimide resin was not added to the binder resin composition for an electrode.

Table 2 shows the results.

Comparative Example 2

The various kinds of testing were performed in the same manner as in Example 1 except that instead of the carbodiimide resin, an epoxy resin was added to the binder resin composition for an electrode in an amount of 1 mass %.

Table 2 shows the results.

Comparative Example 3

The various kinds of testing were performed in the same manner as in Example 3 except that the carbodiimide resin was not added to the binder resin composition for an electrode.

Table 2 shows the results.

Comparative Example 4

The various kinds of testing were performed in the same manner as in Example 3 except that instead of the carbodiimide resin, an epoxy resin was added to the binder resin composition for an electrode in an amount of 1 mass %.

Table 2 shows the results.

Comparative Example 5

The various kinds of testing were performed in the same manner as in Example 5 except that the carbodiimide resin was not added to the binder resin composition for an electrode.

Table 2 shows the results.

Comparative Example 6

The various kinds of testing were performed in the same manner as in Example 5 except that instead of the carbodiimide resin, an epoxy resin was added to the binder resin composition for an electrode in an amount of 1 mass %.

Table 2 shows the results.

Comparative Example 7

The various kinds of testing were performed in the same manner as in Example 7 except that the carbodiimide resin was not added to the binder resin composition for an electrode.

Table 2 shows the results.

Comparative Example 8

The various kinds of testing were performed in the same manner as in Example 7 except that instead of the carbodiimide resin, an epoxy resin was added to the binder resin composition for an electrode in an amount of 1 mass %.

Table 2 shows the results.

Comparative Example 9

The various kinds of testing were performed in the same manner as in Example 9 except that the carbodiimide resin was not added to the binder resin composition for an electrode.

Table 2 shows the results.

Comparative Example 10

The various kinds of testing were performed in the same manner as in Example 9 except that instead of the carbodiimide resin, an epoxy resin was added to the binder resin composition for an electrode in an amount of 1 mass %.

Table 2 shows the results.

Comparative Example 11

The various kinds of testing were performed in the same manner as in Example 11 except that the carbodiimide resin was not added to the binder resin composition for an electrode.

Table 2 shows the results.

Comparative Example 12

The various kinds of testing were performed in the same manner as in Example 11 except that instead of the carbodiimide resin, an epoxy resin was added to the binder resin composition for an electrode in an amount of 1 mass %.

Table 2 shows the results.

TABLE 1

| | | Ex. 1 | Ex. 2 | Ex. 3 | Ex.4 | Ex. 5 | Ex. 6 |
|---|---|---|---|---|---|---|---|
| Polyamide acid and solution composition | | | | | | | |
| Acid component | s-BPDA (mol %) | 100 | 100 | 100 | 100 | | |
| | ODPA (mol %) | | | | | 100 | 100 |
| Diamine component | PPD (mol %) | | | | | | |
| | ODA (mol %) | 90 | 90 | 90 | 90 | | |
| | HMD (mol %) | | | | | 90 | 90 |
| | 3,5-DABA (mol %) | 10 | 10 | | | 10 | 10 |
| | MBAA (mol %) | | | 10 | 10 | | |
| Additive | Carbodiimide resin (relative to polyamide acid, mass %) | 1 | | 1 | | 1 | |
| | 1,3-PBO (relative to polyamide acid, mass %) | | 1 | | 1 | | 1 |
| Solvent | | Water | Water | Water | Water | Water | Water |
| Polyamic acid solution composition | | | | | | | |
| | Logarithmic viscosity | 0.27 | Same as the left | 0.21 | Same as the left | 0.27 | Same as the left |
| | Solid concentration (mass %) | 9.6 | | 9.5 | | 9.2 | |
| | Solution viscosity (Pa · s) | 4.2 | | 3.4 | | 0.1 | |
| | Solution stability | ○ | | ○ | | ○ | |
| Characteristics of binder resin composition | | | | | | | |
| | Heat treatment conditions | 170° C. × 1 Hr | 170° C. × 1 Hr | 170° C. × 1 Hr | 170° C. × 1 Hr | 170° C. × 1 Hr | 170° C. × 1 Hr |
| | Degree of swelling in DMC (mass %) | 0.1 | 0.3 | 0.2 | 0.4 | 0.3 | 0.5 |
| Before swelling testing | 90° peel strength (N/mm) | 0.87 | 0.68 | 0.96 | 0.85 | 0.94 | 0.89 |
| | Class determined by adhesion testing | Class 0 | Class 0 | Class 0 | Class 0 | Class 0 | Class 0 |
| After swelling testing in DMC | 90° peel strength (N/mm) | 0.85 | 0.65 | 0.95 | 0.83 | 0.90 | 0.84 |
| | Class determined by adhesion testing | Class 0 | Class 0 | Class 0 | Class 0 | Class 0 | Class 0 |
| | 90° peel strength retention (%) | 98 | 96 | 99 | 98 | 96 | 94 |

TABLE 1-continued

| Characteristics of electrode | | | | | | | |
|---|---|---|---|---|---|---|---|
| | Degree of swelling in DMC (mass %) | 0.1 | 0.2 | 0.1 | 0.3 | 0.2 | 0.3 |
| Before swelling testing | Class determined by adhesion testing | Class 0 | Class 0 | Class 0 | Class 0 | Class 0 | Class 0 |
| After swelling testing in DMC | Class determined by adhesion testing | Class 0 | Class 0 | Class 0 | Class 0 | Class 0 | Class 0 |

| | | Ex. 7 | Ex. 8 | Ex. 9 | Ex. 10 | Ex. 11 | Ex. 12 |
|---|---|---|---|---|---|---|---|
| Polyamide acid and solution composition | | | | | | | |
| Acid component | s-BPDA (mol %) | | | 50 | 50 | 50 | 50 |
| | ODPA (mol %) | 100 | 100 | 50 | 50 | 50 | 50 |
| Diamine component | PPD (mol %) | | | 20 | 20 | 20 | 20 |
| | ODA (mol %) | | | 70 | 70 | 70 | 70 |
| | HMD (mol %) | 90 | 90 | | | | |
| | 3,5-DABA (mol %) | | | 10 | 10 | | |
| | MBAA (mol %) | 10 | 10 | | | 10 | 10 |
| Additive | Carbodiimide resin (relative to polyamide acid, mass %) | 1 | | 1 | | 1 | |
| | 1,3-PBO (relative to polyamide acid, mass %) | | 1 | | 1 | | 1 |
| Solvent | | Water | Water | Water | Water | Water | Water |
| Polyamic acid solution composition | | | | | | | |
| | Logarithmic viscosity | 0.20 | Same as the left | 0.42 | Same as the left | 0.38 | Same as the left |
| | Solid concentration (mass %) | 9.4 | | 9.7 | | 9.5 | |
| | Solution viscosity (Pa · s) | 0.1 | | 4.1 | | 3.6 | |
| | Solution stability | ○ | | ○ | | ○ | |
| Characteristics of binder resin composition | | | | | | | |
| | Heat treatment conditions | 170° C. × 1 Hr | 170° C. × 1 Hr | 170° C. × 1 Hr | 170° C. × 1 Hr | 170° C. × 1 Hr | 170° C. × 1 Hr |
| | Degree of swelling in DMC (mass %) | 0.4 | 0.5 | 0.1 | 0.2 | 0.0 | 0.1 |
| Before swelling testing | 90° peel strength (N/mm) | 1.02 | 0.85 | 0.78 | 0.70 | 0.83 | 0.72 |
| | Class determined by adhesion testing | Class 0 | Class 0 | Class 0 | Class 0 | Class 0 | Class 0 |
| After swelling testing in DMC | 90° peel strength (N/mm) | 1.00 | 0.84 | 0.72 | 0.65 | 0.83 | 0.70 |
| | Class determined by adhesion testing | Class 0 | Class 0 | Class 0 | Class 0 | Class 0 | Class 0 |
| | 90° peel strength retention (%) | 98 | 99 | 92 | 93 | 100 | 97 |
| Characteristics of electrode | | | | | | | |
| | Degree of swelling in DMC (mass %) | 0.2 | 0.3 | 0.1 | 0.2 | 0.0 | 0.0 |
| Before swelling testing | Class determined by adhesion testing | Class 0 | Class 0 | Class 0 | Class 0 | Class 0 | Class 0 |
| After swelling testing in DMC | Class determined by adhesion testing | Class 0 | Class 0 | Class 0 | Class 0 | Class 0 | Class 0 |

Notes:
Brief description of classification of adhesion testing
Class 0: None of the squares of the lattice is detached.
Class 1: 5% or less is affected.
Class 2: The affected area is more than 5% and 15% or less of the lattice.
Class 3: The affected area is more than 15% and 35% or less of the lattice.
Class 4: The affected area is more than 35% and 65% or less of the lattice.
Class 5: The extent of detachment is worse than Class 4.

TABLE 2

| | | Com. Ex. 1 | Com. Ex. 2 | Com. Ex. 3 | Com. Ex. 4 | Com. Ex. 5 | Com. Ex. 6 |
|---|---|---|---|---|---|---|---|
| Polyamide acid and solution composition | | | | | | | |
| Acid component | s-BPDA (mol %) | 100 | 100 | 100 | 100 | | |
| | ODPA (mol %) | | | | | 100 | 100 |
| Diamine component | PPD (mol %) | | | | | | |
| | ODA (mol %) | 90 | 90 | 90 | 90 | | |
| | HMD (mol %) | | | | | 90 | 90 |

TABLE 2-continued

|  |  |  |  |  |  |  |  |
|---|---|---|---|---|---|---|---|
|  | 3,5-DABA (mol %) |  | 10 | 10 |  |  | 10 | 10 |
|  | MBAA (mol %) |  |  |  | 10 | 10 |  |  |
| Additive | Epoxy resin (relative to polyamide acid, mass %) |  | Not added | 1 | Not added | 1 | Not added | 1 |
|  | Carbodiimide resin (relative to polyamide acid, mass %) |  |  |  |  |  |  |  |
|  | 1,3-PBO (relative to polyamide acid, mass %) |  |  |  |  |  |  |  |
| Solvent |  |  | Water | Water | Water | Water | Water | Water |
| Polyamic acid solution composition |  |  |  |  |  |  |  |  |
|  | Logarithmic viscosity |  | Same as Example 1 |  | Same as Example 3 |  | Same as Example 5 |  |
|  | Solid concentration (mass %) |  |  |  |  |  |  |  |
|  | Solution viscosity (Pa · s) |  |  |  |  |  |  |  |
|  | Solution stability |  |  |  |  |  |  |  |  |
| Characteristics of binder resin composition |  |  |  |  |  |  |  |  |
|  | Heat treatment conditions |  | 170° C. × 1 Hr | 170° C. × 1 Hr | 170° C. × 1 Hr | 170° C. × 1 Hr | 170° C. × 1 Hr | 170° C. × 1 Hr |
|  | Degree of swelling in DMC (mass %) |  | 0.2 | 0.4 | 0.2 | 0.3 | 0.4 | 0.5 |
|  | Before swelling testing | 90° peel strength (N/mm) | 0.25 | No bonding | 0.96 | No bonding | 0.94 | No bonding |
|  |  | Class determined by adhesion testing | Class 4 | Class 5 | Class 4 | Class 5 | Class 3 | Class 5 |
|  | After swelling testing in DMC | 90° peel strength (N/mm) | 0.22 | — | 0.95 | — | 0.90 | — |
|  |  | Class determined by adhesion testing | Class 5 | Class 5 | Class 4 | Class 5 | Class 4 | Class 5 |
|  |  | 90° peel strength retention (%) | 88 | — | 99 | — | 96 | — |
| Characteristics of electrode |  |  |  |  |  |  |  |  |
|  | Degree of swelling in DMC (mass %) |  | 0.2 | 0.3 | 0.1 | 0.4 | 0.3 | 0.3 |
|  | Before swelling testing | Class determined by adhesion testing | Class 3 | Class 5 | Class 3 | Class 5 | Class 5 | Class 5 |
|  | After swelling testing in DMC | Class determined by adhesion testing | Class 4 | Class 5 | Class 3 | Class 5 | Class 5 | Class 5 |

|  |  |  | Com. Ex. 7 | Com. Ex. 8 | Com. Ex. 9 | Com. Ex. 10 | Com. Ex. 11 | Com. Ex. 12 |
|---|---|---|---|---|---|---|---|---|
| Polyamide acid and solution composition |  |  |  |  |  |  |  |  |
| Acid component | s-BPDA (mol %) |  |  |  | 50 | 50 | 50 | 50 |
|  | ODPA (mol %) |  | 100 | 100 | 50 | 50 | 50 | 50 |
| Diamine component | PPD (mol %) |  |  |  | 20 | 20 | 20 | 20 |
|  | ODA (mol %) |  |  |  | 70 | 70 | 70 | 70 |
|  | HMD (mol %) |  | 90 | 90 |  |  |  |  |
|  | 3,5-DABA (mol %) |  |  |  | 10 | 10 |  |  |
|  | MBAA (mol %) |  | 10 | 10 |  |  | 10 | 10 |
| Additive | Epoxy resin (relative to polyamide acid, mass %) |  | Not added | 1 | Not added | 1 | Not added | 1 |
|  | Carbodiimide resin (relative to polyamide acid, mass %) |  |  |  |  |  |  |  |
|  | 1,3-PBO (relative to polyamide acid, mass %) |  |  |  |  |  |  |  |
| Solvent |  |  | Water | Water | Water | Water | Water | Water |
| Polyamic acid solution composition |  |  |  |  |  |  |  |  |
|  | Logarithmic viscosity |  | Same as Example 7 |  | Same as Example 9 |  | Same as Example 11 |  |
|  | Solid concentration (mass %) |  |  |  |  |  |  |  |
|  | Solution viscosity (Pa · s) |  |  |  |  |  |  |  |
|  | Solution stability |  |  |  |  |  |  |  |  |
| Characteristics of binder resin composition |  |  |  |  |  |  |  |  |
|  | Heat treatment conditions |  | 170° C. × 1 Hr | 170° C. × 1 Hr | 170° C. × 1 Hr | 170° C. × 1 Hr | 170° C. × 1 Hr | 170° C. × 1 Hr |
|  | Degree of swelling in DMC (mass %) |  | 0.4 | 0.4 | 0.3 | 0.4 | 0.2 | 0.3 |
|  | Before swelling testing | 90° peel strength (N/mm) | 1.02 | No bonding | 0.78 | No bonding | 0.83 | No bonding |
|  |  | Class determined by adhesion testing | Class 3 | Class 5 | Class 5 | Class 5 | Class 3 | Class 5 |
|  | After swelling testing in DMC | 90° peel strength (N/mm) | 1.00 | — | 0.72 | — | 0.83 | — |
|  |  | Class determined by adhesion testing | Class 3 | Class 5 | Class 5 | Class 5 | Class 4 | Class 5 |
|  |  | 90° peel strength retention (%) | 98 | — | 92 | — | 100 | — |

TABLE 2-continued

Characteristics of electrode

| | | | | | | | |
|---|---|---|---|---|---|---|---|
| Degree of swelling in DMC (mass %) | | 0.3 | 0.3 | 0.2 | 0.4 | 0.2 | 0.2 |
| Before swelling testing | Class determined by adhesion testing | Class 4 | Class 5 | Class 4 | Class 5 | Class 3 | Class 5 |
| After swelling testing in DMC | Class determined by adhesion testing | Class 4 | Class 5 | Class 5 | Class 5 | Class 4 | Class 5 |

Notes:
Brief description of classification of adhesion testing
Class 0: None of the squares of the lattice is detached.
Class 1: 5% or less is affected.
Class 2: The affected area is more than 5% and 15% or less of the lattice.
Class 3: The affected area is more than 15% and 35% or less of the lattice.
Class 4: The affected area is more than 35% and 65% or less of the lattice.
Class 5: The extent of detachment is worse than Class 4.

The invention claimed is:

1. A method for manufacturing an electrode, the method comprising forming an electrode mixture layer on a surface of a current collector using an electrode mixture composition containing at least an electrode active material, an aqueous polyimide precursor solution composition, and a crosslinking agent, the aqueous polyimide precursor solution composition being obtained by dissolving a polyamide acid having a repeating unit represented by a formula (1) below in an aqueous solvent together with an imidazole in an amount of 1.6 moles or more per mole of a tetracarboxylic acid component of the polyamide acid, the imidazole having two or more alkyl groups as substituents, and the crosslinking agent having a carbodiimide group or an oxazoline group; and subsequently performing heat treatment to remove the solvent and perform an imidization reaction of the polyamide acid,

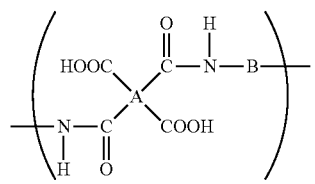
(1)

wherein in the formula (1), A comprises at least one tetravalent group selected from the group consisting of tetravalent groups represented by formulae (2), (3), and (4) below, and B comprises (i) at least one divalent group selected from the group consisting of divalent groups represented by formulae (5), (6), (7), and (8) below and divalent saturated hydrocarbon groups having 4 to 10 carbon atoms; and (ii) at least one divalent group selected from the group consisting of divalent groups represented by formulae (9) and (10) below,

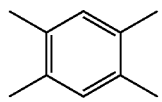
(2)

(3)

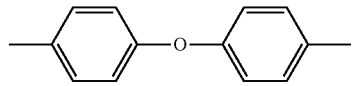
(4)

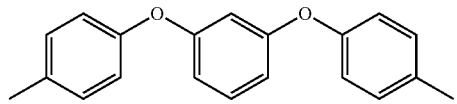
(5)

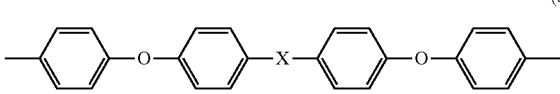
(6)

(7)

(8)

wherein in the formula (8), X is any of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfonediphenoxy group, and

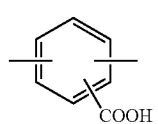
(9)

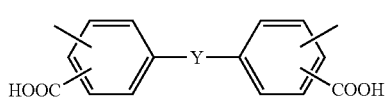

(10)

wherein in the formula (10), Y is any of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfonediphenoxy group.

2. The method for manufacturing an electrode according to claim 1, wherein the imidazole having two or more alkyl groups as substituents is an imidazole selected from the group consisting of 1,2-dimethylimidazole, 2-ethyl-4-methylimidazole, 4-ethyl-2-methylimidazole, and 1-methyl-4-ethylimidazole.

3. The method for manufacturing an electrode according to claim 1, wherein the electrode active material is carbon powder, silicon powder, tin powder, or alloy powder containing silicon or tin.

4. The method for manufacturing an electrode according to claim 1, wherein the electrode active material is a lithium transition metal oxide.

5. The method for manufacturing an electrode according to claim 1, wherein an electrode for a lithium ion secondary battery is obtained.

6. The method for manufacturing an electrode according to claim 2, wherein the electrode active material is carbon powder, silicon powder, tin powder, or alloy powder containing silicon or tin.

7. The method for manufacturing an electrode according to claim 2, wherein the electrode active material is a lithium transition metal oxide.

8. The method for manufacturing an electrode according to claim 2, wherein an electrode for a lithium ion secondary battery is obtained.

9. The method for manufacturing an electrode according to claim 3, wherein an electrode for a lithium ion secondary battery is obtained.

10. The method for manufacturing an electrode according to claim 4, wherein an electrode for a lithium ion secondary battery is obtained.

11. The method for manufacturing an electrode according to claim 6, wherein an electrode for a lithium ion secondary battery is obtained.

12. The method for manufacturing an electrode according to claim 7, wherein an electrode for a lithium ion secondary battery is obtained.

* * * * *